April 8, 1930.　　　　J. C. LUSSE　　　　1,754,172
AMUSEMENT CAR
Filed Sept. 28, 1926　　　4 Sheets-Sheet 3

Inventor:
Joseph C. Lusse.
by his Attorneys,
Howson & Howson

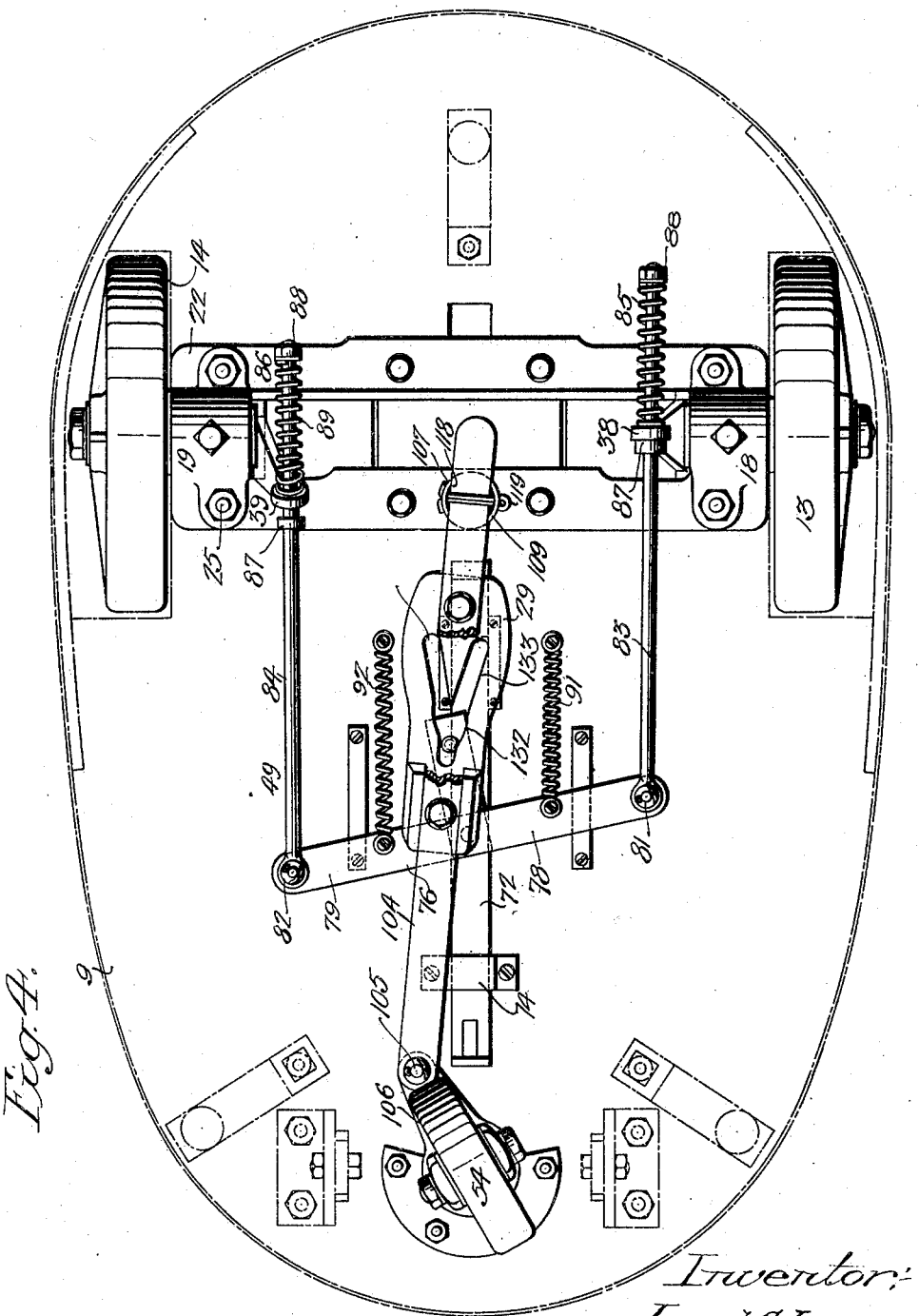

Patented Apr. 8, 1930

1,754,172

UNITED STATES PATENT OFFICE

JOSEPH C. LUSSE, OF PHILADELPHIA, PENNSYLVANIA

AMUSEMENT CAR

Application filed September 28, 1926. Serial No. 138,299.

My invention relates to motor vehicles, and it has particular relation to such vehicles as are adapted for use in amusement parks.

A broad object of my invention is to provide a car of the above character that shall be characterized by simple and efficient propelling mechanism as well as controlling apparatus therefor, particularly designed to permit the occupant to turn the car within a minimum radius with a minimum effort.

Another object of my invention is to provide control mechanism for the car requiring a minimum movement on the part of the operator, and permitting a quick turning of the car.

A further object of my invention is to provide means, whereby the frictional force of the driving element on the car wheel may be increased to a desired value upon the turning of the steering wheel and thereafter held substantially constant upon the continued turning of the steering wheel.

Other objects and applications of my invention, as well as details of construction and operation, whereby my invention may be practiced, will be apparent more fully hereinafter, when taken in connection with the accompanying drawings, wherein Fig. 1 is a longitudinal sectional view of a car embodying my invention;

Fig. 4 is a view similar to Fig. 3, illustrating the effect of partly turning the steering wheel from the mid position of Fig. 3.

Figure 1:
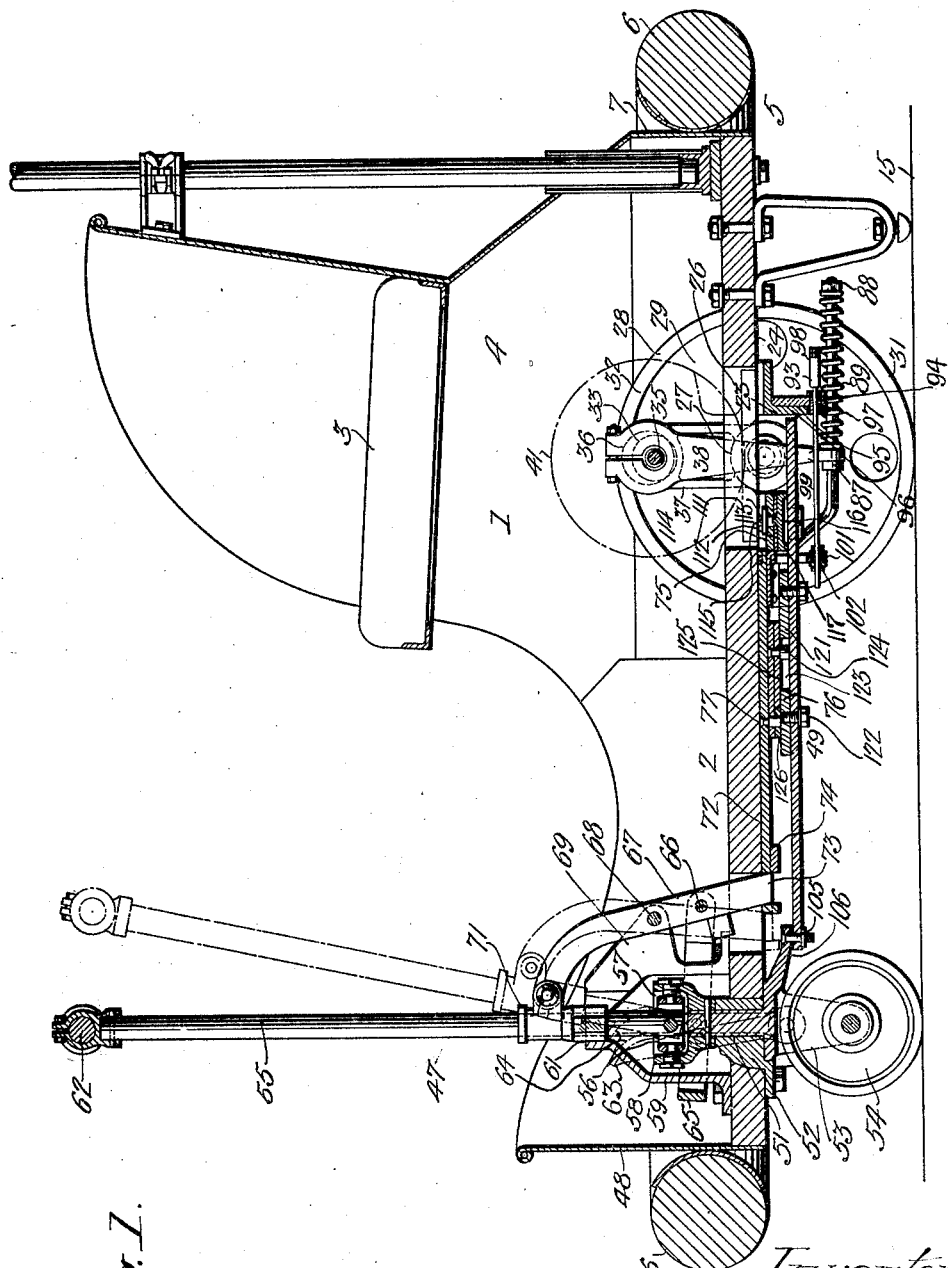

Referring to the drawings, a car body 1 comprises a platform 2, a seat 3, a supporting structure 4 for said seat, which extends upwardly from an outer edge 5 of the platform 2, and a suitable shock resisting bumper 6 which encircles the base portion 7 of the structure 4 and is secured thereto in any desired manner. Opposite sides 8 and 9 of the platform 2 are provided with openings 11 and 12 through which wheels 13 and 14 respectively extend from a metallic floor surface 15. The wheels 13 and 14 are respectively provided with axles 16 and 17 supported in bearings 18 and 19 formed on opposite ends 21 and 22 of a bracket member 23. The member 23 extends transversely of the car platform 2 and is secured to an underside 24 of the platform 2 by bolts 25 in order to close partially a similarly extending recess 26 in the platform 2.

The car wheel 13 comprises a central hub portion 27, an outer rim 28 and an interconnecting web portion 29, an outer side 31 of the rim 28 being adapted to engage the metallic floor surface 15, while an inner side 32 is adapted to co-act with a frictional driving element 33. The opposite car wheel 14 is similar to the car wheel 13 just described and it is also actuated by a driving friction element 34.

The friction element 33 may be actuated relative to the car wheel 13 to vary the driving effect of the former by mounting the same on a shaft 35 which is rotatably supported eccentrically of the axis of a rotary bearing member 36. The bearing member 36 is journaled in an upper end of a standard 37 extending vertically from the bracket 23. The member 36 may be actuated by means of a downwardly extending lever 38. Thus, by reason of the eccentric position of the driving element 33 with respect to the central axis of the member 36, when the latter is actuated by the lever 38, the frictional driving element 33 is moved into or out of engagement with the adjacent side 32 of the wheel 13, depending upon the direction of movement of said actuating arm 38. The driving element 34 on the opposite side of the car is similarly mounted, whereby the movement of an operating lever 39 may cause the engagement or disengagement of the driving element 34 and the car wheel 14.

In order that the shaft section 35 may be positively actuated by a driving motor 41 for all desired positions of the frictional driving element 33, I provide shaft sections 42 of the motor 41 with a pinion 43, the latter being mounted in axial alignment with the central axis of the movable member 36. An adjacent end of the shaft 35 carries a two-part casing 44, an inner side of which is provided with gear teeth forming an internal gear-wheel 45 adapted to mesh with the driving pinion 43. Inasmuch as the bearing member 36, which carries the gear-wheel 45, is in alignment with the axis of the driving pinion 43, a proper working relation is maintained between the two gear elements 43 and 45 for all positions of the frictional driving element 33 relative to the car wheel 13. The driving element 34 is similarly connected to a shaft section 46 of the motor 41, whereby an operative connection may be maintained therebetween for all working positions of the frictional driving element 34. The foregoing connection between the friction elements 33 and 34 and the motor 41 constitutes one of the features of the co-pending application of Robert J. Lusse, Serial No. 122,633, filed July 15, 1926.

The steering mechanism for the car comprises a steering post 47 having differential movements, that is, rotary and swinging movements. The steering post 47 is mounted at a forward end 48 of the car and associated by mechanism 49 with the lever arms 38 and 39, whereby the frictional driving elements 33 and 34 may be rendered effective and ineffective according to the position of the steering post 47, as will frequently appear. The steering post 47 comprises a base section 51 which is mounted in a casting 52 for movement about a vertical axis. The lower end of the base section 51, which is positioned below the surface 24 of the platform 2, is provided with a fork 53 adapted to rotatably support a steering wheel 54. An upper section 55 of the steering means 47 is horizontally pivoted on one element 56 of a universal joint 57, another element 58 of which is mounted on the upper end of the base section 51. The element 58 is shown as an upwardly extending cup-shaped member embracing the element 56, whereby it may retain a desired quantity of lubricant (not shown).

The universal joint 57 may be enclosed in a housing 59 extending upwardly from the platform 2, and it is provided with an opening 61 through which the swinging post section 55 may extend. The outlet 61 is elongated sufficiently to permit a desired swinging movement of the post section 55, and it is of such transverse dimensions as to serve as a guide for the same during such movement. An upper end of the post section 55 terminates in a handle 62.

The interest of the operator may be further stimulated by the provision of pedal mechanism 63 adapted to facilitate the swinging movement of the post section 55, as illustrated in Fig. 1, wherein a pair of pedals 64 are pivotally mounted on the bearing casting 52. The pedals 64 may be connected by a yoke structure 65 to a pivotal supporting point 66 on a lever 67. The lever 67 is pivotally supported by a pin 68 intermediate spaced projections 69 of the housing 59. An upper end of the lever 67 is pivotally mounted on a sleeve 71 secured to the swinging post section 55. Thus, a forward movement of the pedals 64 into the dot-and-dash line position of Fig. 1, causes a tilting of the lever 67 and, consequently, a rearward movement of the post section 55 into the dot-and-dash line position.

The mechanism 49, which interconnects the rotary swinging steering post 47 and the operating levers 38 and 39 for the frictional driving elements 33 and 34, comprises a strap member 72 centrally mounted on the underside 24 of the platform 2 and provided at one end with a recess 73 adapted to receive the lower end of the pivoted lever 67, whereby said strap member 72 may be actuated longitudinally of the car upon a swinging movement of the post section 55. The strap member 72 is guided during such movement by means of a plate 74 which also serves to hold the same in position relative to the platform 2. An opposite end of the member 72 may be slidably mounted on an upper side 75 of the bracket member 23, Fig. 1.

A second strap member 76 is pivotally mounted to the strap member 72 at an intermediate point 77, and it is provided with oppositely extending arms 78 and 79 respectively providing pivotal supports 81 and 82 for corresponding ends of operating rods 83 and 84. The opposite ends of these rods are connected by resilient devices 85 and 86 to the levers 38 and 39, respectively.

The resilient device 85 comprises a front abutment 87 and a rear adjustable abutment 88. These abutments are respectively placed on opposite sides of the lever arm 38 and a spring 89. The ends of the spring 89 engage the abutment 88 and the lever 38, causing the latter to engage the front abutment 87, as shown in Fig. 1. The parts are so arranged that when the steering wheel 54 is in the normal midposition and the swinging post section is in its ineffective vertical solid-line position, as shown in Fig. 1, the frictional driving wheel 33 is disengaged from the car wheel 37 and the arm 38 is in engagement with the front abutment 87 under the force of the spring 89. The resilient device 86 is similar in all respects to the resilient device 85 just described.

Figure 3:
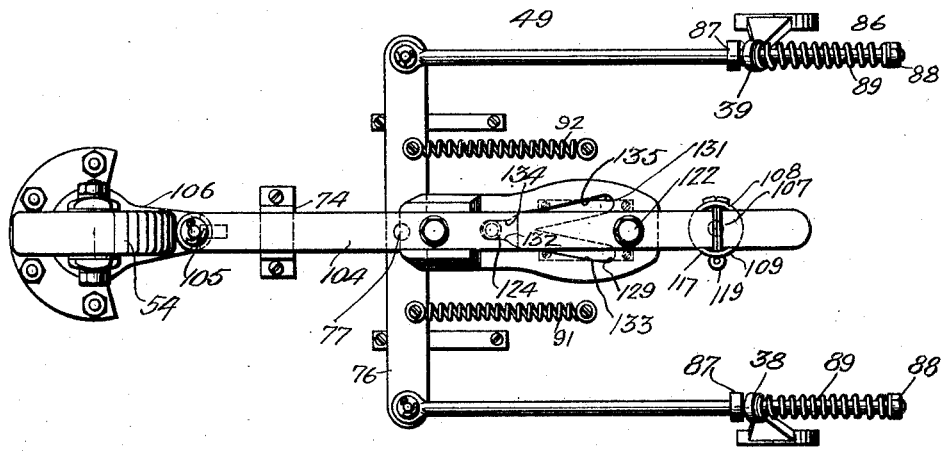
Fig. 3 is a detail view of the control mechanism of Fig. 2, showing the effect of actuating the swinging post section into its inclined position.

When the post section 55 is actuated rearwardly into the dot-and-dash line position of Fig. 1, the strap member 72 is actuated forwardly, causing a corresponding movement of the pivoted strap member 76 against the force of springs 91 and 92 which respectively extend from the arms 78 and 79 of said member 76 to the platform 2. The longitudinal movement of the strap member 76 causes a similar movement of the rods 83 and 84 and a compression of the springs 89 until the force thereof is sufficient to cause a forward movement of the operating levers 38 and 39 and the consequent engagement of the driving elements 33 and 34 with the car wheels 13 and 14, respectively. The force of each of the springs 89 is such as to permit a predetermined movement of the frictional driving elements 33 and 34 independent of the actuating rods 83 and 84, so that during the operation just described, a space is formed between each of the front abutments 87 and its associated lever, as shown in Fig. 3. When the swinging post section 55 is released, it returns to the solid-line vertical position of Fig. 1 under the force of the springs 91 and 92, and the driving frictional elements 33 and 34 move into their normal ineffective position.

The operation of the driving motor 41 may be controlled in accordance with the movement of the swinging post section 55 by means of a switch 93, Fig. 1, which comprises a supporting block 94 mounted on a rear side 95 of a rear flange section 96 of the bracket member 23. The block member 94 is provided with a central aperture 97 for the removable reception of a metallic plug element 98 mounted on a rear end of a rod 99, the front end of which is carried by a supporting frame 101. The frame 101 is secured to the rear end of the strap member 72. The forward end of the rod 99 is provided with insulating bushings secured in position by adjustable abutments 102, so that said rod may be actuated forwardly and rearwardly in accordance with a movement of the strap member 72. The movable contact member 98 is of such length that when the swinging post section 55 is in its vertical position shown in Fig. 1, it is disengaged from a pair of spaced contact members 103 resiliently mounted on the block 94.

When the swinging post section 55 is actuated rearwardly to cause a forward movement of the strap member 72 and the consequent actuation of the frictional driving elements 33 and 34 into resilient engagement with the car wheels 13 and 14, respectively, a corresponding forward movement is imparted to the contact element 98, with the result that the spaced contact members are electrically connected together causing the energized action of the driving motor 41 and the operation of the frictional driving elements 33 and 34. The arrangement of the several parts is such that the motor circuit is closed by the movement of the plug element 98 just prior to the engagement of the frictional driving elements 33 and 34 with their cooperating car wheels 13 and 14, respectively. Thus, the motor 41 is not required to start up under the load of the car, but is subjected to load only after reaching its normal operating speed.

When the swinging post section 55 is released, it moves into its original solid-line position shown in Fig. 1, causing a rearward movement of the strap member 72, and, as a result, a corresponding movement of the plug element 98 out of engagement with the contact members 103 to break the motor circuit. The motor is thus energized only when it is desired to have the car in motion, resulting in a material saving in power and a consequent decrease in operating expense. The switch 93 is described in greater detail in my co-pending application, Serial No. 122,633, July 15, 1926.

One of the important features of my invention is the provision of mechanism, whereby a relatively small movement of the steering wheel 54 by the operator from the mid position of Fig. 3 is sufficient to cause one of the driving elements 33, 34 to be rendered ineffective and the frictional force of the other driving element increased to a desired extent,—a further movement of the steering wheel 54 from the mid position, however, occurring independently of the driving elements 33 and 34. To this end, I provide a member 104, the forward end of which is pivotally secured at 105 to a rearward extension 106 of the post casting 52. A rear end of the lever 104 is pivotally supported at 107 by a structure 108 supported on the underside of the bracket member 23.

The structure 108 comprises a cylindrical block 109 having one side 112 provided with a pivot pin 113 extending through an aperture 114 in the bracket 23. The block 109 may be rotatably secured in this position by means of a cotter pin 115. An opposite side 116 of the block 109 is provided with a recess forming a circular flange 117. The latter is provided with aligned slots 118 for the slidable reception of the rear end of the lever 104. A cotter pin 119, which is supported by the annular flange 117, serves to secure the lever 104 in position. The structure 108 thus permits sliding, as well as pivotal movements of the lever 104 occurring upon the turning of the steering wheel 54 in either direction from the mid position of Fig. 3.

Figure 2:
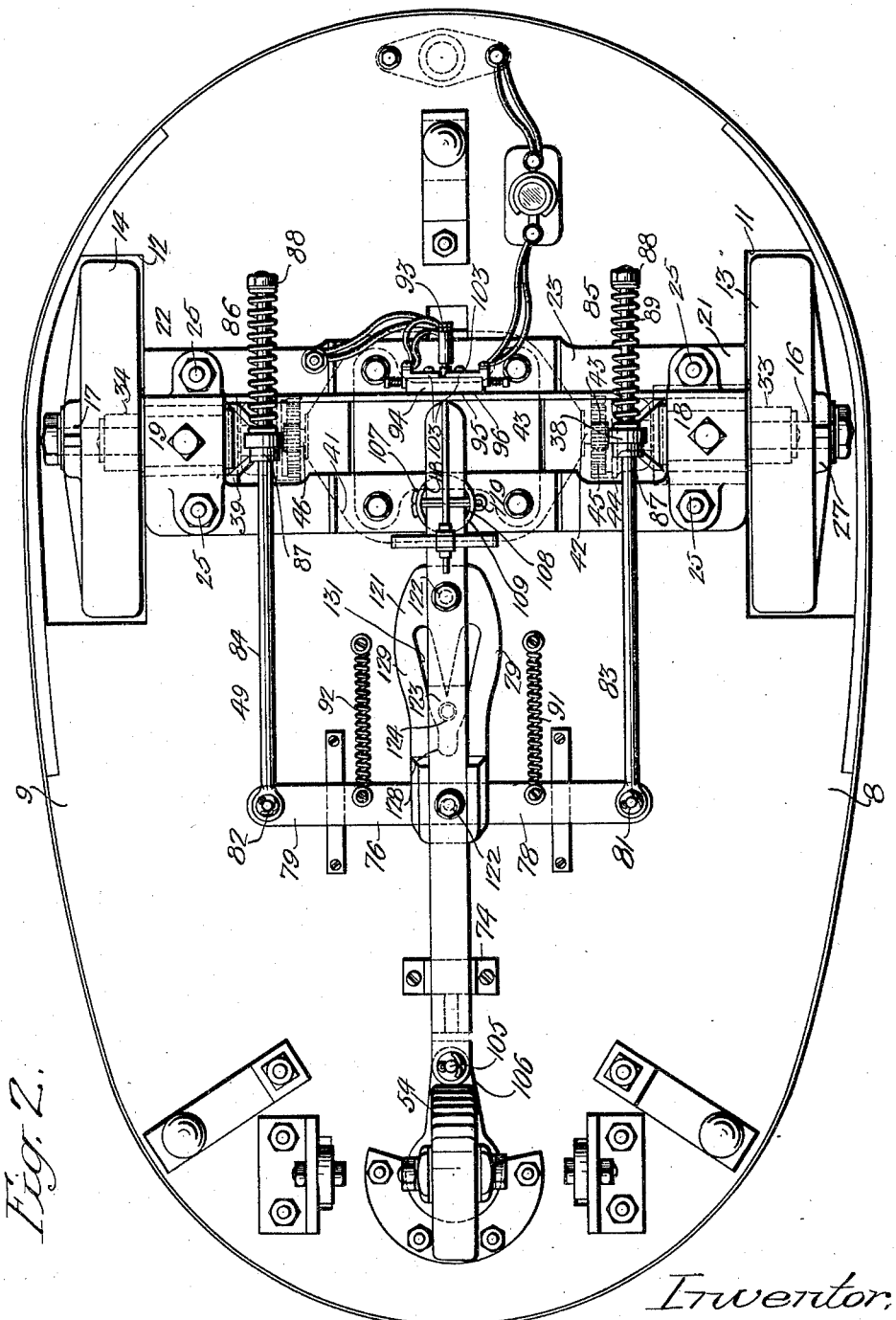
Fig. 2 is an inverted plan view of the underside of the car, illustrating the position of the control mechanism when the steering wheel is in the mid position and the swinging post section is in the normal vertical position.

In accordance with my invention, a cam plate 121 is rigidly secured on an upper side of the lever 104 by bolts 122, and it is provided with a slot 123 for the reception of a lug 124. The latter extends downwardly from an underside of a rear end portion 125 of a third arm 126 of the pivotally mounted strap member 76. While a separate cam plate 121 is shown, similar results may be obtained by directly slotting the lever 104. The slot 123 comprises an enlarged intermediate portion 127, a narrow front end portion 128, and narrow rear end portions 129 and 131 respectively extending from the intermediate portion 127 at different angles. These portions are so designed that when the lug 124 is centrally positioned in the intermediate slot portion 127 as shown in Fig. 2, the swinging post section 55 and the steering wheel 54 are in the mid position shown in solid line in Fig. 1.

When the swinging post section 55 is actuated rearwardly in order to start the car, the lug 124 is moved forwardly into the narrow front slot portion 128, as shown in Fig. 3. Such movement causes an increase in the spacing of the lug 124 and the pivotal mounting for the member 104 at 107 and hence an increase in the effective lever arm of the member 104. In this position of the parts, the switch 93 is closed, causing the motor 41 to drive the car wheels 13 and 14 through the frictional driving elements 33 and 34. Should the operator turn the steering wheel 54 from the position of Fig. 3 to that of Fig. 4, the swinging movement of the lever 104 causes the lug 124 to move into the position shown in the latter figure. During this movement, the operating rod 83 is moved rearwardly, causing the driving element 33 to be disengaged from the car wheel 13. The force of the driving frictional element 34 on the car wheel 12, however, is increased by reason of the opposite forward movement of the operating rod 84. Thus, it will be noted that is necessary to turn the car wheel 54 through only a relatively slight angle in order to disconnect the car wheel 13 from its driving element 33. This is particularly advantageous inasmuch as it is not only facilitates the quick controlling of the car, but also increases the life of the steering wheel 54.

Figure 5:
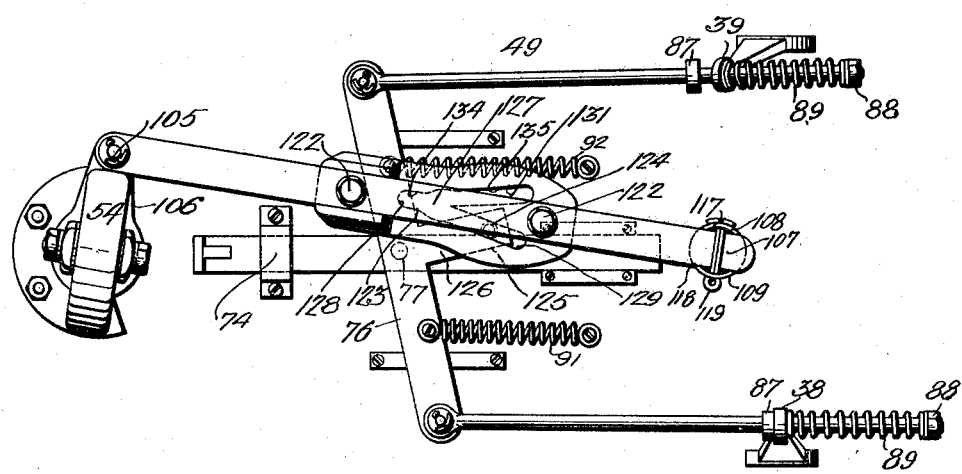
Fig. 5 is a similar view, showing the effect of a further actuation of the steering wheel from the position of Fig. 4 into its limiting position.

Inasmuch as it is undesirable to increase the frictional force between the driving element 34 and the car wheel 12 beyond the amount effected during the turning movement of the steering wheel 54 just described, edges 132 and 133 of the slotted portions 127 and 129 are so formed that the continued movement of the car wheel 54 from the position of Fig. 4 to that of Fig. 5, during which the lug 124 moves over said edges, occurs without causing a substantial movement of said lug 124. Hence, the movement of the steering wheel 54, following the initial disengagement of the driving element 33 from the car wheel 13 and the further actuation of the driving element 34 into engagement with the car wheel 12, fails to affect these parts. Such independent movement is particularly advantageous to the driving element in operation, which in the present case is element 34, since it limits the frictional force to a value permitting slippage when the steering wheel 54 is in the position most likely to cause the stalling of the motor 41. Should the steering wheel 54 be actuated from the mid-position of Fig. 3 oppositely to that shown in Fig. 4, then the foregoing operations are reversed, edges 134 and 135 of the portions 127 and 131 permitting the actuation of the steering wheel 54 beyond the desired predetermined extent independently of the frictional driving element 33 and 34.

The slotted portions 127, 129 and 131 are also so proportioned that the steering wheel 54 may be turned through a desired maximum angle, with the swinging post section 55 in the solid-line position, without causing the actuation of either of the driving elements 33, 34 into engagement with their co-operating car wheels 13 and 14 or the closing of the motor contact switch 98.

While I have shown only one embodiment of my invention for the purpose of describing the same and illustrating its principles of construction and operation, it is apparent that various changes and modifications may be made therein without departing from the spirit of my invention and I desire, therefore, that only such limitations shall be imposed thereon as are indicated in the appended claims or as are demanded by the prior art.

I claim:

1. In combination, a pair of traction elements, a pair of driving elements therefor, steering means, mechanism for establishing a resilient engagement between said driving elements and said traction elements, and means for operatively associating said mechanism and said steering means, so that the force of engagement of said driving elements may be oppositely varied during a portion only of one movement of said steering means and thereafter held substantially constant during a remaining portion of said movement.

2. A car having a pair of wheels, a pair of driving elements therefor, a rotary swinging steering post, means responsive to a swinging movement of said post for causing a movement of said elements into operative relation to said wheels, and means whereby said operative relation may be oppositely varied during a portion only of the rotary movement of said post.

3. A car having a driven wheel, a driving element for said wheel having effective and ineffective positions, a two-part steering post having a steering wheel, one part being mounted to swing relative to the other, means responsive to said swinging part for actuating said driving element from one of its positions to another, and means whereby a portion only of the rotary movement of said post may cause an opposite movement of said driving element, the latter being independent of said steering means during the remaining portion of said rotary movement.

4. A car body having a pair of wheels, a pair of driving elements for said wheels movable into and out of engagement therewith, steering means for said car having rotary and swinging movements, means responsive to said swinging movement for establishing a desired resilient engagement between said driving elements and said wheels, and means responsive to a portion only of another movement for causing only one of said driving elements to remain in said resilient engagement.

5. A car having a pair of traction elements, a pair of driving elements, means for varying the effect of said driving elements on said traction elements, steering means having a mid position, and means including a cam, whereby the effect of said elements may be oppositely varied during a predetermined movement of said steering means from said mid position but thereafter maintained substantially constant upon a continued movement of said steering means.

6. In combination, a pivotally mounted member having an actuating rod connected therewith and adapted to be connected to a driving element, steering means. a pivotally mounted link adapted to be actuated by said steering means, and cam means for operatively associating said link and said first-mentioned member in such manner that the latter is actuated during a predetermined portion only of the maximum movement of said link.

7. A car having a driving element, steering means having at least two movements, means responsive to one of said movements for actuating said driving element comprising a movable supporting member, a second pivotally-mounted member and an operating rod connected to said last-mentioned member, a member responsive to the other movement of said steering means, and cam means for operatively associating said last-mentioned member and said second-mentioned member in such manner that the latter is connected to the former during a portion only of one of the movements of said steering means.

8. A car having a driving element, steering means, mechanism for actuating said driving element comprising a bodily movable member, a second pivotally-mounted member having an arm extending therefrom provided with a lug and an operating rod connected to said second-mentioned member adapted to cause the actuation of said driving element upon the movement of said first-mentioned member, a movable member adapted to be actuated by said steering means, and a cam carried by said last-mentioned member provided with a slot for the reception of said lug, said slot being so formed that said driving element is actuated for a predetermined portion only of the path of travel of said steering means.

9. In combination, a pair of operating rods, a pivotally mounted member for oppositely actuating said rods, steering means, and a member having a pivotal mounting and also connected to said steering means, one of said members being provided with a lug and the other provided with a slotted section for the reception of said lug, said slot being so formed that said first-mentioned member is actuated by said second-mentioned member during a portion only of the maximum movement of said steering means.

10. Steering means having differential movements, a pivotally mounted member, means whereby said member may have a bodily movement upon the occurrence of one of said movements, and a second pivotally mounted member responsive to another of said movements, one of said members having a lug and the other a slotted section for the reception of said lug, said slotted section having an enlarged portion permitting a predetermined movement of said steering means independently of said first-mentioned member, said lug being movable into another portion of said slot upon a bodily movement of said first-mentioned member, whereby the actuation of said second-mentioned member may cause a movement of said first-mentioned member until said lug is actuated clear of said last-mentioned slotted portion.

11. In combination, driving elements, a bodily movable member, having a pivotal movement, means controlled by said member, whereby the effect of said driving elements may be oppositely varied, and a pivotally mounted member, one of said members having a lug and the other a slotted portion for the reception of said lug, said slot having one portion permitting said second-mentioned member to cause a pivotal movement of said first-mentioned member, said slot having other portions into which said lug may be actuated, depending upon the direction of the pivotal movement, said last-mentioned portions serving to prevent said second-mentioned member from further actuating said first-mentioned member.

12. In combination, driving elements, a bodily movable member having a pivotal movement, means controlled by said member, whereby the effect of said elements may be oppositely varied, and a second member having a pivotal mounting, said members being respectively provided with a lug and a slotted section for said lug, said lug being spaced from the pivotal mounting for said first-mentioned member, said bodily movement of said first-mentioned member increasing the spacing between said lug and said second-mentioned pivotal mounting, said slot being so formed that opposite movements of said second-mentioned member may cause opposite pivotal movements of said first-mentioned member, the further operation of said second-mentioned member in either direction being independent of said first-mentioned member.

13. Steering means having a bodily movable part and a wheel part movable in either direction from a mid position, a driving element, means responsive to a movement of said bodily movable part for causing the actuation of said driving element, said means comprising a bodily movable member, a second member pivotally mounted thereon having oppositely extending arms and operating rods connected to said arms having lost-motion connections to said driving elements, said second member having a lug spaced from the pivotal mounting therefor, a link having a pivotal mounting connected to said wheel part so as to be actuated thereby, and a cam plate provided with a slotted section for the reception of said lug, said slotted section being so formed that a predetermined movement of said wheel part in either direction from said mid position causes the actuation of said rods, the further actuation of said wheel part occurring independently of said rods.

14. A car body having a traction element, a driving element, an actuating motor, steering means having two movements, mechanism responsive to one of said movements for varying the effect of said driving element on said traction element, means responsive to one of said movements for controlling the energization of said motor, and means responsive to another of said movements, whereby said effect may be varied during a portion only of said movement.

JOSEPH C. LUSSE.